(12) United States Patent
Otoguro et al.

(10) Patent No.: US 10,710,639 B2
(45) Date of Patent: Jul. 14, 2020

(54) VEHICLE REAR STRUCTURE

(71) Applicant: Toyota Jidosha Kabushiki Kaisha, Toyota-shi, Aichi-ken (JP)

(72) Inventors: Kazuma Otoguro, Toyota (JP); Jumpei Nishide, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/131,176

(22) Filed: Sep. 14, 2018

(65) Prior Publication Data

US 2019/0152531 A1    May 23, 2019

(30) Foreign Application Priority Data

Nov. 21, 2017  (JP) ................................. 2017-223234

(51) Int. Cl.
*B62D 21/15*   (2006.01)
*B62D 25/02*   (2006.01)
*B62D 25/04*   (2006.01)
*B60J 5/04*    (2006.01)

(52) U.S. Cl.
CPC ......... *B62D 21/157* (2013.01); *B62D 25/025* (2013.01); *B62D 25/04* (2013.01); *B60J 5/0443* (2013.01)

(58) Field of Classification Search
CPC .... B62D 21/157; B62D 25/04; B62D 25/025; B60J 5/0443
USPC .............. 296/193.06, 203.03, 209, 30, 146.6
See application file for complete search history.

(56) References Cited

U.S. PATENT DOCUMENTS

| | | | | |
|---|---|---|---|---|
| 9,701,182 | B1* | 7/2017 | Hallman | B62D 21/157 |
| 9,988,087 | B2* | 6/2018 | Yamamoto | B62D 25/025 |
| 10,259,504 | B2* | 4/2019 | Park | B62D 25/025 |
| 2016/0257345 | A1* | 9/2016 | Hasegawa | B62D 25/025 |
| 2017/0050679 | A1* | 2/2017 | Shirooka | B62D 25/025 |
| 2017/0313358 | A1* | 11/2017 | Narahara | B62D 25/04 |

FOREIGN PATENT DOCUMENTS

| | | |
|---|---|---|
| EP | 1790552 A2 | 5/2007 |
| JP | 2007-145099 A | 6/2007 |
| JP | 2008-213826 A | 9/2008 |

* cited by examiner

*Primary Examiner* — Jason S Morrow
*Assistant Examiner* — E Turner Hicks
(74) *Attorney, Agent, or Firm* — Dinsmore & Shohl LLP

(57) ABSTRACT

A vehicle rear structure includes: an impact beam; a rocker outer rear and a rocker inner rear extending upward from a rear portion of a rocker; a rear wheel house outer including a front portion extending in the vehicle front-rear direction and placed between the rocker outer rear and the rocker inner rear; and a bulk. The bulk includes: a first wall provided between the rocker outer rear and the rocker inner rear and joined to the rocker outer rear; a second wall bending from the first wall to extend toward the rocker inner rear; and a third wall placed at a position where the third wall at least partially overlaps with the impact bean as viewed in a vehicle width direction, the third wall being bending from the second wall and joined to the front portion of the rear wheel house outer.

8 Claims, 6 Drawing Sheets

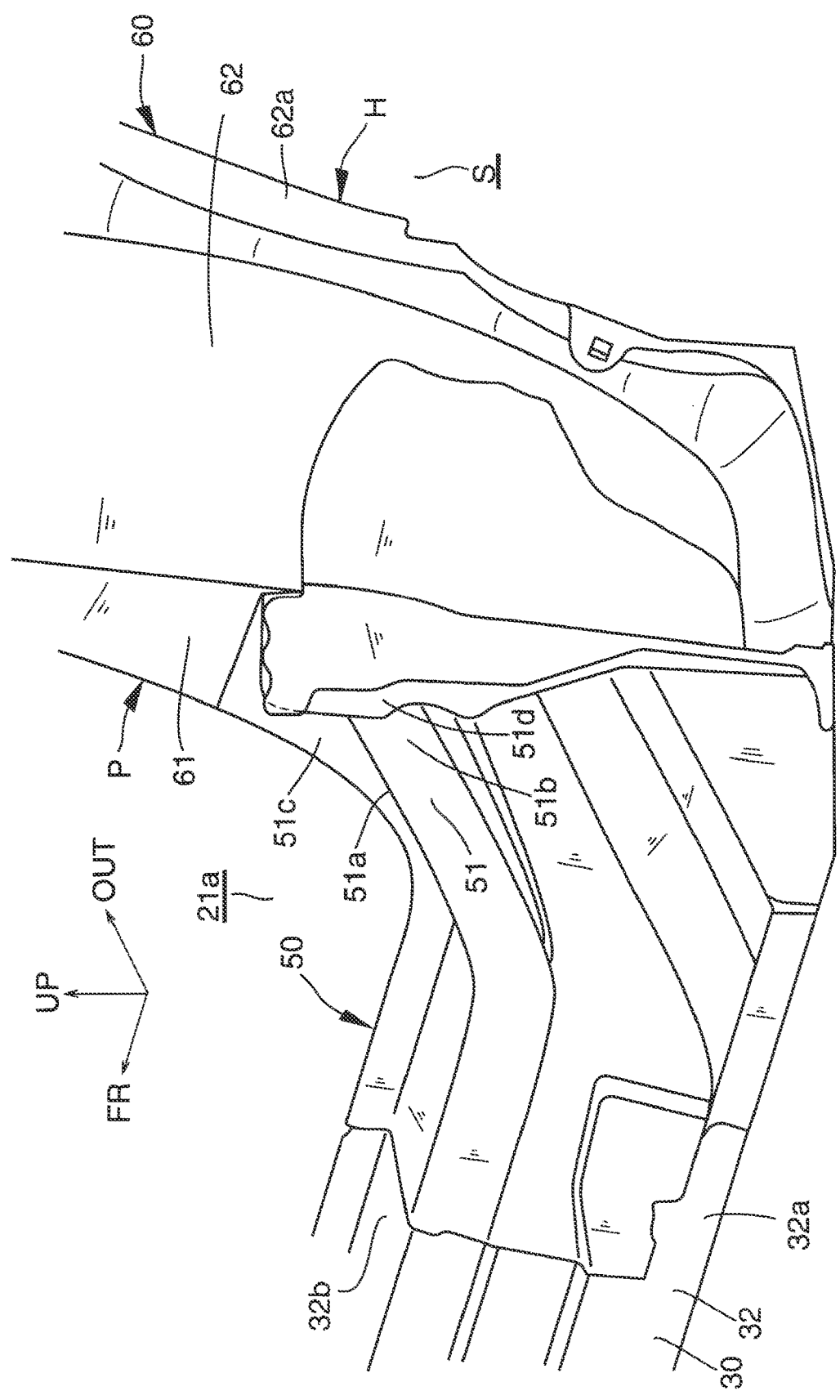

VEHICLE REAR STRUCTURE

CROSS-REFERENCE TO RELATED APPLICATIONS

This application claims priority to Japanese Patent Application No. 2017-223234 filed on Nov. 21, 2017, which is incorporated herein by reference in its entirety including the specification, drawings and abstract.

BACKGROUND

1. Technical Field

This disclosure relates to a vehicle rear structure.

2. Description of Related Art

In terms of performance at the time of a side collision of a vehicle, a rear portion of a rocker of the vehicle requires a structure that receives invasion of an impact beam provided inside a rear door of the vehicle and introduces a load to a vehicle under component with a high rigidity.

Japanese Unexamined Patent Application Publication No. 2007-145099 (JP 2007-145099 A) describes a vehicle rear structure configured such that a load transmission member is set so as to project front a rocker outer rear (an outer member of a rocker rear) to a rocker inner rear (an inner member of the rocker rear) and the load transmission member is placed so as to overlap with an impact beam inside a rear door as viewed in the vehicle width direction (i.e. in a side view).

However, there is room for improvement in the vehicle rear structure in that a load transmitted from the rocker outer rear to the load transmission member at the time of a side collision is efficiently transmitted to the rocker inner rear via a rear wheel house.

SUMMARY

This disclosure provides a vehicle rear structure that can efficiently transmit a load input into a rocker outer rear to a rocker inner rear via a rear wheel house.

An aspect of the disclosure provides a vehicle rear structure including: an impact beam extending in a vehicle front-rear direction inside a rear door; a rocker outer rear and a rocker inner rear extending upward in a vehicle up-down direction from a rear portion of a rocker in the vehicle front-rear direction; a rear wheel house outer including a front portion extending in the vehicle front-rear direction and placed between the rocker outer rear and the rocker inner rear; and a bulk including a first wall provided between the rocker outer rear and the rocker inner rear and joined to the rocker outer rear, a second wall bending from the first wall to extend toward the rocker inner rear, and a third wall placed at a position where the third wall at least partially overlaps with the impact beam as viewed in a vehicle width direction, the third wall being bending from the second wall and joined to the front portion of the rear wheel house outer.

The vehicle rear structure according to the above aspect yields the following effect. The bulk includes the first wall joined to the rocker outer rear, and the second wall bending from the first wall so as to extend toward the rocker inner rear (inwardly in the vehicle width direction), and further includes the third wall bending from the second wall and joined to the front portion of the rear wheel house outer. Hereby, a load input into the rocker outer rear from the impact beam at the time of a side collision of the vehicle can be effectively transmitted to the front portion of the rear wheel house outer through the second wall of the bulk. Since the front portion of the rear wheel house outer is placed between the rocker outer rear and the rocker inner rear, the load input into the front portion of the rear wheel house outer is transmitted to the rocker inner rear. Accordingly, it is possible to efficiently transmit the load input into the rocker outer rear to the rocker inner rear via the bulk and the front portion of the rear wheel house outer.

Further, since the bulk is configured such that the first wall is joined to the rocker outer rear and the third wall is joined to the front portion of the rear wheel house outer, it is possible to restrain movement of the bulk relative to the rocker outer rear and the rear wheel house outer, and it is possible to efficiently transmit a load from the rocker outer rear to the front portion of the rear wheel house outer via the bulk.

In the above aspect, the third wall may be joined to the front portion of the rear wheel house outer at a plurality of points which differ in position each other at least in the vehicle front-rear direction.

With the configuration, it is possible to join the bulk to the front portion of the rear wheel house outer in a wide range in comparison with a case where the bulk is joined to the front portion of the rear wheel house outer at one place (one point). Accordingly, it is possible to effectively restrain a relative deformation between the bulk and the rear wheel house outer. Hereby, it is possible to further improve load transmission efficiency from the bulk to the front portion of the rear wheel house outer.

In the above aspect, the second wall may extend in a direction parallel to an extending direction of the impact beam as viewed in the vehicle width direction.

With the configuration, an overlapping amount between the second wall and the impact beam can be made large as viewed in the vehicle width direction in comparison with a case where the second wall does not extend in the direction parallel to the extending direction of the impact beam, e.g., a case where the second wall of the bulk extends in a direction perpendicular to the extending direction of the impact beam. Hereby, it is possible to transmit a load from the rocker outer rear to the front portion of the rear wheel house outer via the bulk in a wide range, thereby making it possible to further improve the load transmission efficiency.

In the above aspect, a joining portion between the third wall and the front portion of the rear wheel house outer may be provided at a position overlapping with the impact beam or on an extension line of the impact beam in an extending direction of the impact beam as viewed in the vehicle width direction.

With the configuration, it is possible to yield the following effect. Since the joining portions between the third wall of the bulk and the front portion of the rear wheel house outer are provided at positions overlapping with the impact beam or on the extension line of the impact beam in the extending direction thereof, it is possible to efficiently restrain relative movement between the bulk and the front portion of the rear wheel house outer at the time of load transmission. This is advantageous in terms of load transmission from the bulk to the front portion of the rear wheel house outer.

In the above aspect, the second wall may include a front-side portion placed at a position overlapping with the impact beam as viewed in the vehicle width direction, and a rear-side portion placed behind the front-side portion at a position that does not overlap with the impact beam as viewed in the vehicle width direction; and a length of the rear side portion of the second wall in the vehicle front-rear direction may be equal to or longer than a length of the front-side portion of the second wall in the vehicle front-rear direction.

In the configuration, as viewed in the vehicle width direction, the length, in the front-rear direction, of the rear-side portion of the second wall of the bulk is equal to or longer than the length, in the front-rear direction, of the front-side portion of the second wall. Accordingly, when a load from the rocker outer rear is transmitted to the front portion of the rear wheel house outer via the bulk, the rear-side portion of the second wall withstands the load between the rocker outer rear and the front portion of the rear wheel house outer so as to serve as a support portion, thereby making it possible to effectively restrain the second wall from being displaced (falling down) such that its front side rotates inwardly in the vehicle width direction relative to its rear side alone with a deformation of the rocker outer rear. Hereby, the posture of the bulk can be maintained at the time of load transmission via the bulk, and this is advantageous in terms of load transmission.

In the above aspect: the bulk may include a fourth wall bending from a front end portion of the second wall to extend downward in the vehicle up-down direction; the fourth wall may include an upper-side portion placed at a position overlapping with the impact beans as viewed in the vehicle width direction, and a lower-side portion placed below the upper-side portion in the vehicle up-down direction and not overlapping with the impact beam as viewed in the vehicle width direction; and a length of the lower-side portion of the fourth wall in the vehicle up-down direction may be equal to or longer than a length of the upper-side portion of the fourth wall in the vehicle up-down direction.

In the configuration, as viewed in the vehicle width direction, the length, in the up-down direction, of the lower-side portion of the fourth wall of the bulk is equal to or longer than the length, in the up-down direction, of the upper-side portion of the fourth wall. Accordingly, when a load from the rocker outer rear is transmitted to the front portion of the rear wheel house outer via the bulk, the lower-side portion of the fourth wall withstands the load between the rocker outer rear and the front portion of the rear wheel house outer so as to serve as a support portion, thereby making it possible to effectively restrain the fourth wall from being displaced (falling down) such that its upper side rotates inwardly in the vehicle width direction relative to its lower side along with a deformation of the rocker outer rear. Hereby, the posture of the bulk can be maintained at the time of load transmission via the bulk, and this is advantageous in terms of load transmission.

In the above aspect, the rear wheel house outer may induce a lateral extension portion bending from a rear end portion of the front portion in the vehicle front-rear direction so as to extend outwardly in the vehicle width direction; the front portion and the lateral extension portion of the rear wheel house outer may be joined to the rocker outer rear so as to form a closed section together with the rocker outer rear; and the bulk may be provided inside the closed section.

With the configuration, it is possible to increase rigidities of the rocker outer rear and the rear wheel house outer in comparison with a case where the closed section portion is not formed by the rear wheel house outer and the rocker outer rear. Further, since the bulk is provided inside the closed section portion, it is possible to further increase the rigidity of the closed section portion by the bulk. Accordingly, it is possible to further improve transmission efficiency of a load transmitted from the rocker outer rear to the front portion of the rear wheel house outer via the bulk.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a perspective view of the rocker inner rear and its vicinity in the vehicle rear structure of the embodiment of the disclosure when they are viewed from the inner side in the vehicle width direction and from the rear side.

DETAILED DESCRIPTION OF EMBODIMENTS

Figure 1:
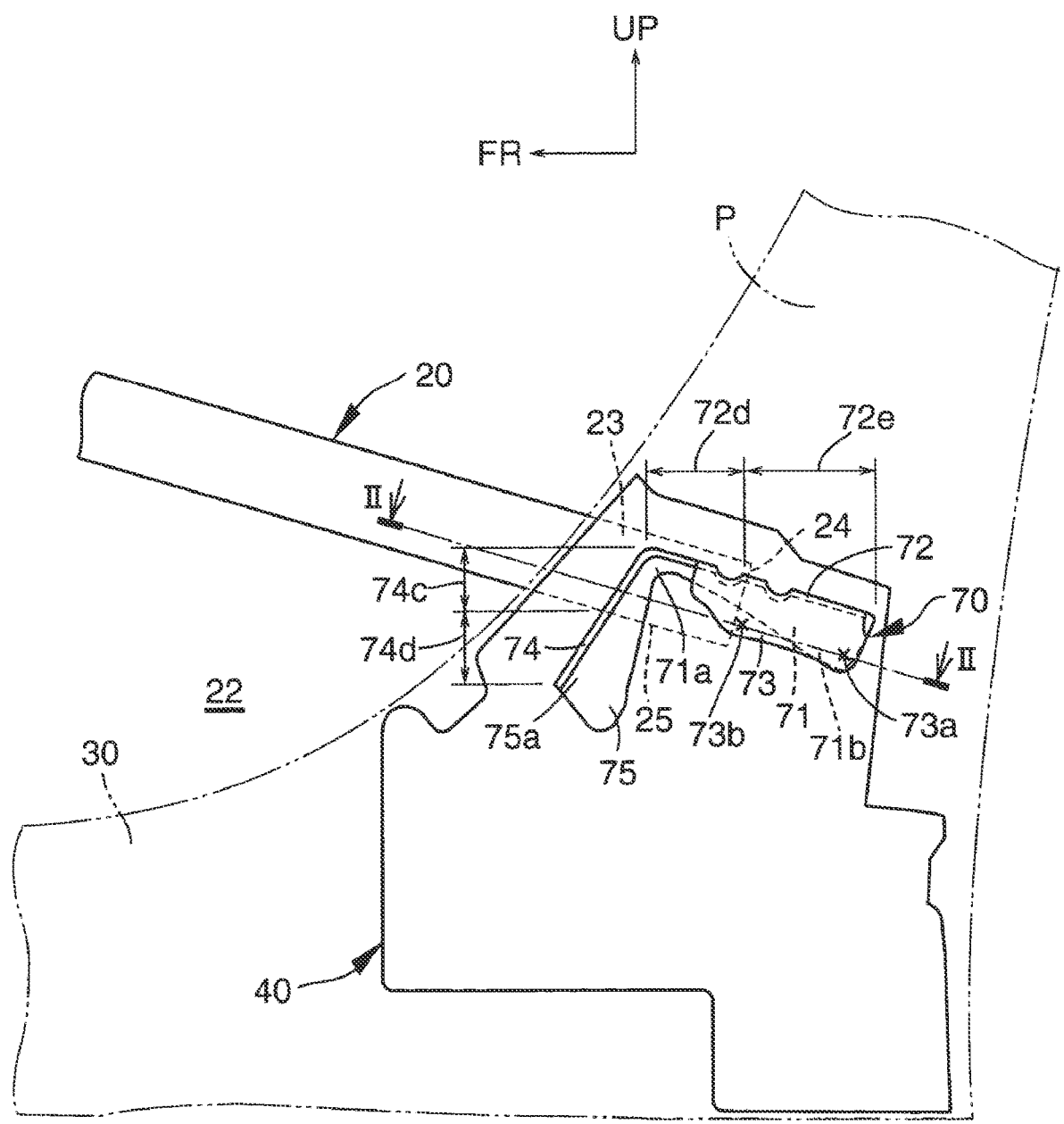
FIG. 1 is a schematic plan view illustrating a positional relationship of an impact beam, a rocker outer rear, and a bulk in a vehicle rear structure of an embodiment of the disclosure, when they are viewed from the inner side in the vehicle width direction.

A vehicle rear structure 10 of an embodiment of the disclosure will be described with reference to the drawings. Note that, in the drawings, UP indicates the upper side, FR indicates the front side in the vehicle front-rear direction, and OUT indicates the outer side in the vehicle width direction. Note that, in the following description, the up-down direction indicates the vehicle up-down direction and the front-rear direction indicates the vehicle front-rear direction unless otherwise specified.

Figure 2:
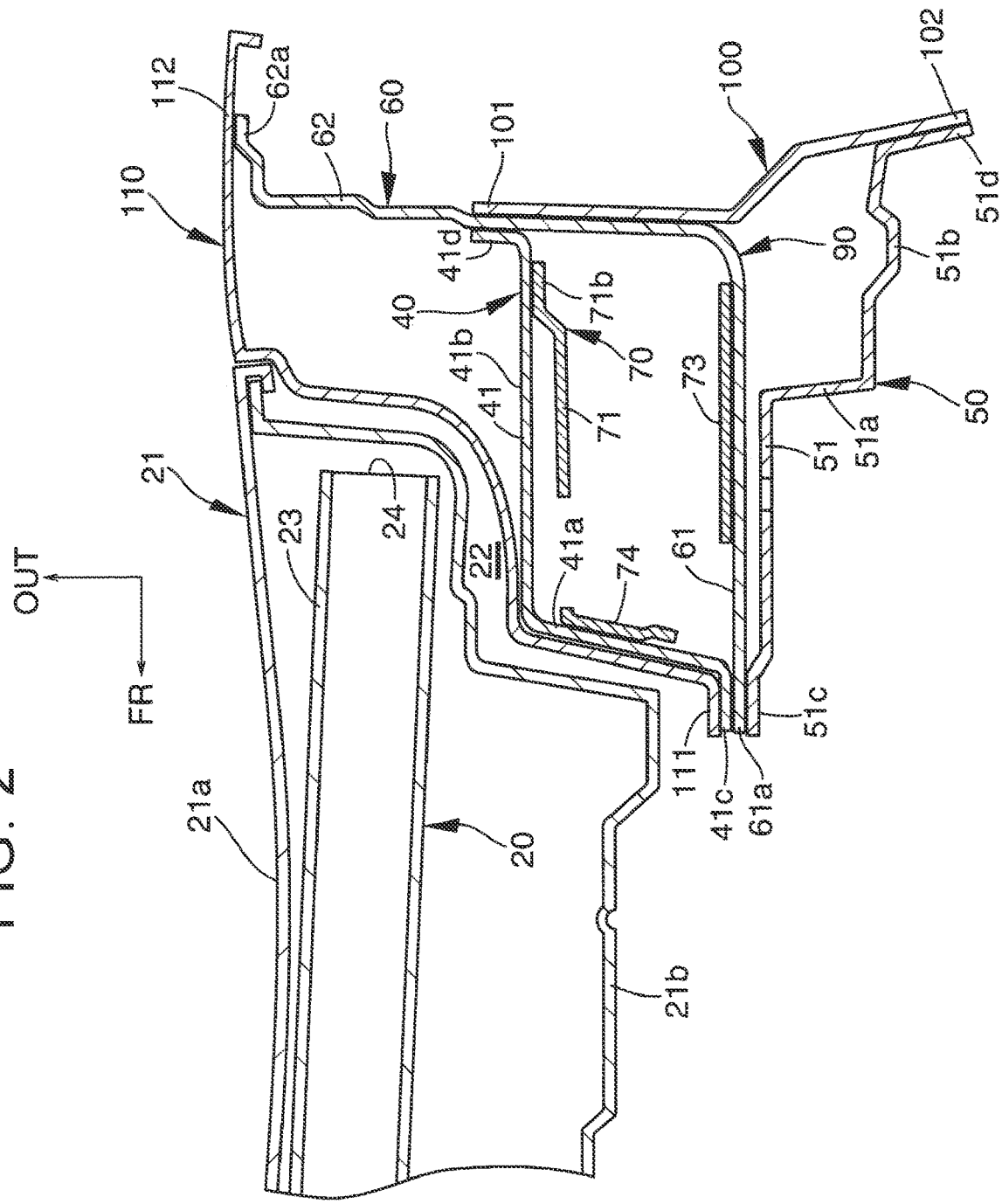
FIG. 2 is a sectional view in a part along a line II-II in FIG. 1 in the vehicle rear structure of the embodiment of the disclosure.

As illustrated in FIGS. 1 and 2, the vehicle rear structure 10 of the embodiment of the disclosure includes an impact beam 20, a rocker 30, a rocker outer rear 40, a rocker inner rear 50, a rear wheel house outer 60, and a bulk 70.

The impact beam 20 is provided so as to extend in the front-rear direction inside a rear door 21. More specifically, as illustrated in FIG. 2, the impact beam 20 is disposed between a door outer panel 21a and a door inner panel 21b in the rear door 21 and is attached to the door inner panel 21b in a fixed manner by use of a mounting bracket and the like (not shown). As illustrated in FIG. 1, the impact beam 20 is attached to the door inner panel 21b in an inclined state such that its rear side is placed at a lower position than its front side.

The rocker 30 is a frame member provided in a lower part of each end of the vehicle in its width direction so as to extend in the front-rear direction. The rocker 30 has a closed section structure in which a rocker outer 31 (see FIGS. 4, 5) on the outer side in the vehicle width direction is joined to a rocker inner 32 (see FIG. 6) on the inner side in the vehicle width direction. A rocker reinforcement (not shown) configured to section the closed section in the vehicle width direction may be provided inside the rocker outer 31 and the rocker inner 32.

Figure 4:
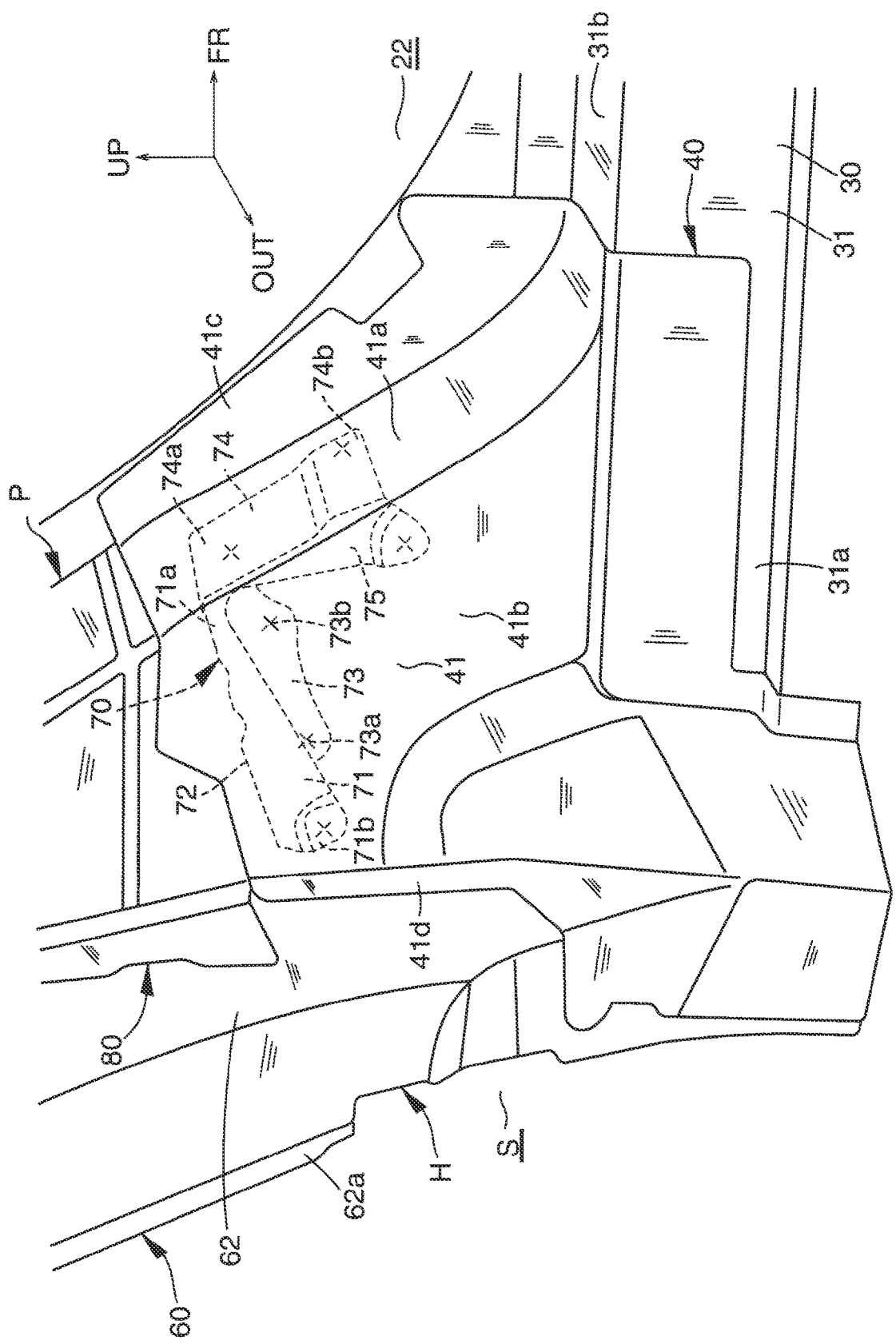
FIG. 4 is a perspective view of the rocker outer rear and its vicinity in the vehicle rear structure of the embodiment of the disclosure when they are viewed from the outer side in the vehicle width direction.

As illustrated in FIG. 4, the rocker outer rear 40 is fixed to a rear portion 31a including a rear end portion of the rocker outer 31. The rocker outer rear 40 is made of a molten zinc plating steel sheet, for example. The rocker outer rear 40 includes an outer rear upper portion 41 extending upward from the rear portion 31a of the rocker outer 31. The outer rear upper portion 41 is provided behind an opening 22 provided above the rocker 30 so that the rear door 21 is placed, and constitutes a part of a pillar (a rear pillar) P provided ahead of an inner space S of a rear wheel house H. An upper end portion (an upper end portion of the outer rear upper portion 41) of the rocker outer rear 40 is joined to a quarter reinforcement 80 fixed to the rear wheel house outer 60 and configured to increase rigidity of the pillar P. That is, the rocker outer rear 40 connects the rocker outer 31 to the quarter reinforcement 80.

The outer rear upper portion 41 includes a front wall 41a smoothly extending upward and rearward from a top face 31b of the rocker outer 31, and a side wall 41b bending from an outer end portion of the front wall 41a in the vehicle width direction so as to extend rearward. Further, the outer rear upper portion 41 includes a front flange 41c bending from an inner end portion of the front wall 41a in the vehicle width direction so as to extend forward, and a rear flange 41d bending from a rear end portion of the side wall 41b so as to extend outwardly in the vehicle width direction. Note that "bending" in this disclosure may include not only bending that is performed with a sudden angle change so that a fold line is formed, but also so-called "curving" in which bending is performed without forming a fold line.

As illustrated in FIG. 6, the rocker inner rear 50 is fixed to a rear portion 32a including a rear end portion of the rocker inner 32. The rocker inner rear 50 is made of the same material as the rocker outer rear 40 so as to have a plate thickness larger than the rocker outer rear 40. The rocker inner rear 50 includes an inner rear upper portion 51 extending upward from the rear portion 32a of the rocker inner 32. The inner rear upper portion 51 constitutes a part of the pillar (rear pillar) P. The inner rear upper portion 51 includes a front wall 51a smoothly extending upward and rearward from a top face 32b of the rocker inner 32, and a side wall 51b bending from an inner end portion of the front wall 51a in the vehicle width direction so as to extend rearward. A length, in the vehicle width direction, of the front wall 51a of the inner rear upper portion 51 is uniform in the up-down direction. Further, the inner rear upper portion 51 includes a front flange 51c bending from an outer end portion of the front wall 51a in the vehicle width direction so as to extend forward, and a rear flange 51d bending from a rear end portion of the side wall 51b so as to extend inwardly in the vehicle width direction.

The rear wheel house outer 60 is a component part of the rear wheel house H. The rear wheel house outer 60 is made of a molten zinc plating steel sheet, for example. As illustrated in FIG. 2, the rear wheel house outer 60 includes a front portion 61 and a lateral extension portion 62. The front portion 61 extends forward and is placed between the rocker outer rear 40 and the rocker inner rear 50. A front end portion 61a of the front portion 61 is positioned between the front flange 41c of the rocker outer rear 40 and the front flange 51c of the rocker inner rear 50 and is joined to the front flanges 41c, 51c by spot welding, for example. The lateral extension portion 62 bends from a rear end portion of the front portion 61 so as to extend outwardly in the vehicle width direction. An intermediate part, in the vehicle width direction, of the lateral extension portion 62 is joined to the rear flange 41d of the rocker outer rear 40 by spot welding, for example.

The front end portion 61a of the front portion 61 of the rear wheel house outer 60 is joined to the front flange 41c of the rocker outer rear 40 and the intermediate part of the lateral extension portion 62 in the vehicle width direction is joined to the rear flange 41d of the rocker outer rear 40, so that a closed section portion 90 having a closed section in a sectional view perpendicular to the up-down direction is formed by the front portion 61 and the lateral extension portion 62 of the rear wheel house outer 60 and the front wall 41a and the side wall 41b of the rocker outer rear 40. Hereby, rigidity of the vehicle rear structure 10 is increased.

A wheel house outer extension 100 extending inwardly in the vehicle width direction from the lateral extension portion 62 is attached, in a fixed manner, to the lateral extension portion 62 of the rear wheel house outer 60. An outer end portion 101, in the vehicle width direction, of the wheel house outer extension 100 is joined to the lateral extension portion 62 of the rear wheel house outer 60 by spot welding, for example, as well as the rear flange 41d of the rocker outer rear 40. Further, an inner end portion 102, in the vehicle width direction, of the wheel house outer extension 100 is joined to the rear flange 51d of the rocker inner rear 50 by spot welding, for example.

The rear wheel house outer 60 and the rocker outer rear 40 are covered with a rear quarter panel 110 that is an outer plate of the vehicle from the outer side in the vehicle width direction. A front end portion 111 of the rear quarter panel 110 is joined to the front flange 41c of the rocker outer rear 40 by spot welding, for example. Further, an intermediate part 112, in the front-rear direction, of the rear quarter panel 110 is joined to an outer end portion 62a, in the vehicle width direction, of the lateral extension portion 62 of the rear wheel house outer 60 by spot welding, for example.

The bulk 70 is provided between the rocker outer rear 40 and the rocker inner rear 50 in the vehicle width direction. It is desirable that the bulk 70 be provided as a single component for a reduction in the number of components. The bulk 70 is made of a cold rolled steel sheet (made of a high-strength steel plate), for example. The bulk 70 is provided inside the closed section portion 90. The bulk 70 is provided so as to restrain deformation of the closed section portion 90 at the time of a side collision of the vehicle and directly transmit a load from the rocker outer rear 40 to the rear wheel house outer 60 and to increase a reaction force from the rocker outer rear 40 toward the impact beam 20 at the time of the side collision. On this account, the bulk 70 may be called a reinforcement.

Figure 3:
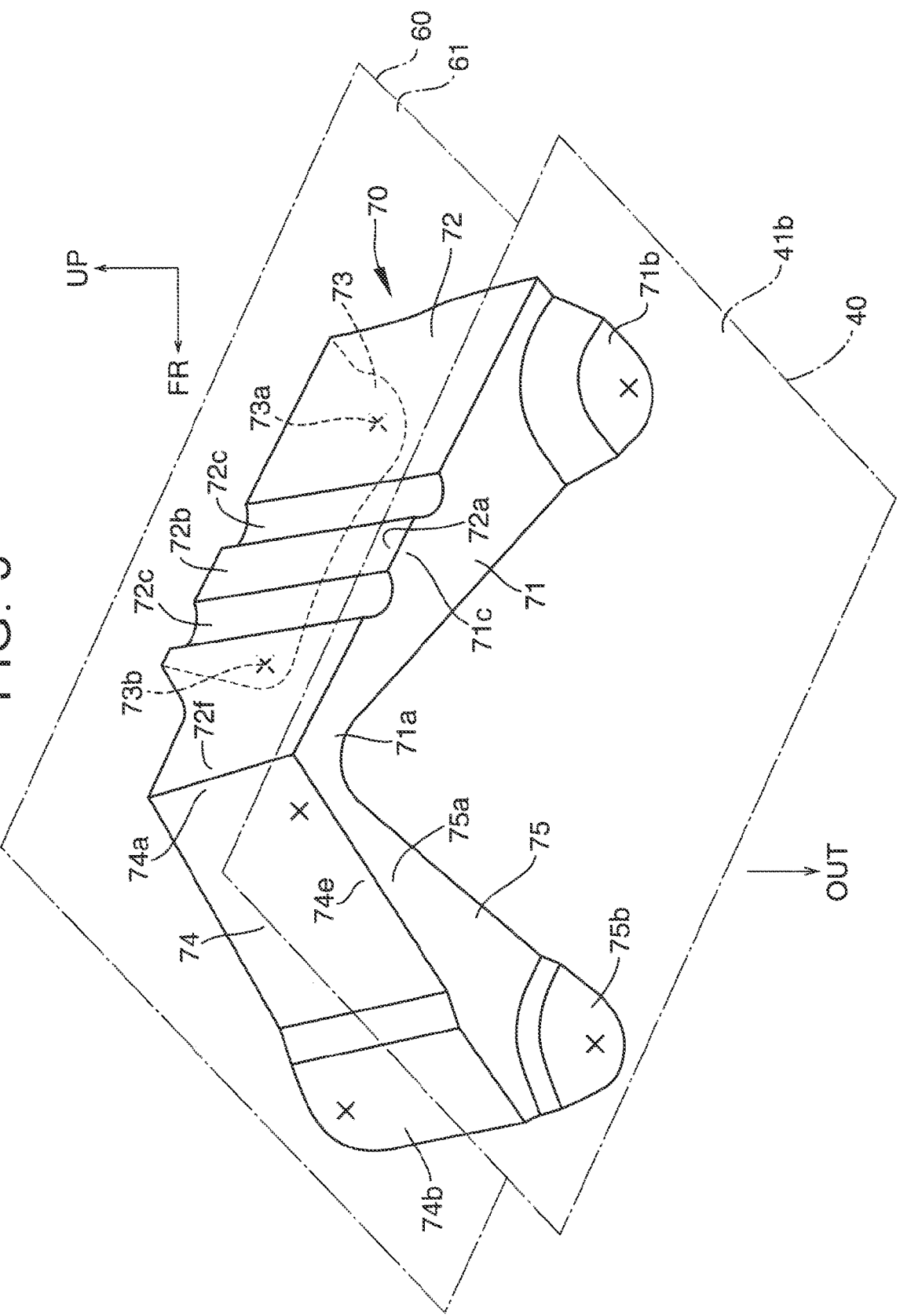
FIG. 3 is a perspective view of the bulk in the vehicle rear structure of the embodiment of the disclosure.

As illustrated in FIG. 1, the bulk 70 is placed at a position where the bulk 70 at least partially overlaps with a rear end portion 23 of the impact beam 20 as viewed in the vehicle width direction (i.e. in a side view). As illustrated in FIG. 3, the bulk 70 includes a first wall 71 joined to the rocker outer rear 40, a second wall 72 bending from the first wall 71 so as to extend toward the rocker inner rear 50 (inwardly in the vehicle width direction), and a third wall 73 bending from the second wall so as to be joined to the front portion 61 of the rear wheel house outer 60.

As illustrated in FIG. 4, the first wall 71 extends in the front-rear direction and its length in the up-down direction becomes larger toward the rear side. The length of the first wall 71 in the front-rear direction is generally the same as the length, in the front-rear direction, of the side wall 41b of the outer rear upper portion 41 of the rocker outer rear 40. On this account, the front end portion 71a of the first wall 71 is provided closer to the front wall 41a of the outer rear upper portion 41, and a rear end portion 71b of the first wall 71 is provided generally at the same position, in the front-rear direction, as the rear end portion of the side wall 41b of the outer rear upper portion 41. The rear end portion 71b of the first wall 71 is joined to the side wall 41b of the rocker outer rear 40 by spot welding, for example. Note that "X" in the drawings of this disclosure indicates a welding part.

As illustrated in FIG. 3, the second wall 72 is provided so as to bend from an upper edge portion 71c of the first wall 71 and extend inwardly in the vehicle width direction. The second wall 72 is provided over the upper edge portion 71c of the first wall 71 in the front-rear direction. The length, in the vehicle width direction, of the second wall 72 is generally the same as a distance, in the vehicle width direction, between the side wall 41b of the rocker outer rear 40 and the front portion 61 of the rear wheel house outer 60. On this account, an outer end portion 72a of the second wall 72 in the vehicle width direction is provided closer to the side wall 41b of the rocker outer rear 40, and an inner end portion 72b of the second wall 72 in the vehicle width direction is provided closer to the front portion 61 of the rear wheel house outer 60.

Since the second wall 72 is provided over the upper edge portion 71c of the first wall 71 in the front-rear direction and the length, in the vehicle width direction, of the second wall 72 is generally the same as the distance, in the vehicle width direction, between the side wall 41b of the rocker outer rear 40 and the front portion 61 of the rear wheel house outer 60, the second wall 72 is provided generally over the whole closed section portion 90 in a plan view. Accordingly, a load input into the rocker outer rear 40 from the impact beam 20 at the time of a side collision of the vehicle can be directly transmitted to the front portion 61 of the rear wheel house outer 60 generally over the whole closed section portion 90 via the bulk 70 withstanding the load. Since the load is transmitted by the second wall 72 withstanding the load, the second wall 72 is not joined to members around the second wall 72. Note that, in order to increase rigidity of the second wall 72 so as to restrain the second wall 72 from buckling, at least one recessed portion 72c (or a projection portion) extending in the vehicle width direction may be provided. The example illustrated herein shows a case where two recessed portions 72c are provided.

As illustrated in FIG. 1, the second wall 72 extends in a direction parallel to the extending direction of the impact beam 20 in the side view. In the side view, the second wall 72 includes a front-side portion 72d placed at a position overlapping with the impact beam 20, and a rear-side portion 72e placed behind the front-side portion 72d at a position that does not overlap with the impact beam 20. In the side view, the front-side portion 72d of the second wall 72 is placed forward of a rear end 24 of the impact beam 20, and the rear-side portion 72e of the second wall 72 is placed behind the rear end 24 of the impact beam 20. The length, in the front-rear direction, of the rear-side portion 72e of the second wall 72 is the same as or longer than the length, in the front-rear direction, of the front-side portion 72d of the second wall 72.

As illustrated in FIG. 3, the third wall 73 is provided so as to bend from the inner end portion 72b of the second wall 72 in the vehicle width direction and extend downward. The third wall 73 is provided only in a part from an intermediate part, in the front-rear direction, of the inner end portion 72b of the second wall 72 in the vehicle width direction to a rear end thereof. On this account, the length, in the front-rear direction, of the third wall 73 is shorter than the lengths, in the front-rear direction, of the first wall 71 and the second wall 72. The third wall 73 and the front portion 61 of the rear wheel house outer 60 are joined to each other at least at a plurality of points in the front-rear direction. Note that the example illustrated herein shows a case where the third wall 73 is joined to the front portion 61 at two places 73a, 73b in the front-rear direction.

Joining portions 73a, 73b between the third wall 73 and the front portion 61 of the rear wheel house outer 60 are provided at positions overlapping with the impact beam 20 or on the extension line of the impact beam 20 in its extending direction toward the rear side, in the side view.

In addition to the first to third walls 71 to 73, the bulk 70 further includes a fourth wall 74 bending from a front end portion 72f of the second wall 72 so as to extend downward, and a fifth wall 75 bending from a front end portion 71a of the first wall 71 so as to extend downward.

As illustrated in FIG. 4, the fourth wall 74 is provided over the front end portion 72f of the second wall 72 in the vehicle width direction. The fourth wall 74 extends downward along the front wall 41a in the outer rear upper portion 41 of the rocker outer rear 40. An upper end portion 74a and a lower end portion 74b are joined to the front wall 41a by spot welding, for example. As illustrated in FIG. 1, in the side view, the fourth wall 74 includes an upper-side portion 74c placed at a position overlapping with the impact beam 20, and a lower-side portion 74d placed below the upper-side portion 74c so as not to overlap with the impact beam. In the side view, the upper-side portion 74c of the fourth wall 74 is placed above a lower edge 25 of the impact beam 20, and the lower-side portion 74d of the fourth wall 74 is placed below the lower edge 25 of the impact beam 20. The length, in the up-down direction, of the lower-side portion 74d of the fourth wall 74 is the same as or longer than the length, in the up-down direction, of the upper-side portion 74c of the fourth wall 74.

The fifth wall 75 extends in the up-down direction and its length in the front-rear direction becomes larger toward the lower side. A front end portion 75a of the fifth wall 75 is continuous with an outer end portion 74e, in the vehicle width direction, of the fourth wall 74. Accordingly, the fifth wall 75 is provided so as to bend from the outer end portion 74e of the fourth wall 74 in the vehicle width direction and extend rearward. A lower end portion 75b of the fifth wall 75 is joined to the side wall 41b of the rocker outer rear 40 by spot welding, for example.

Figure 5:
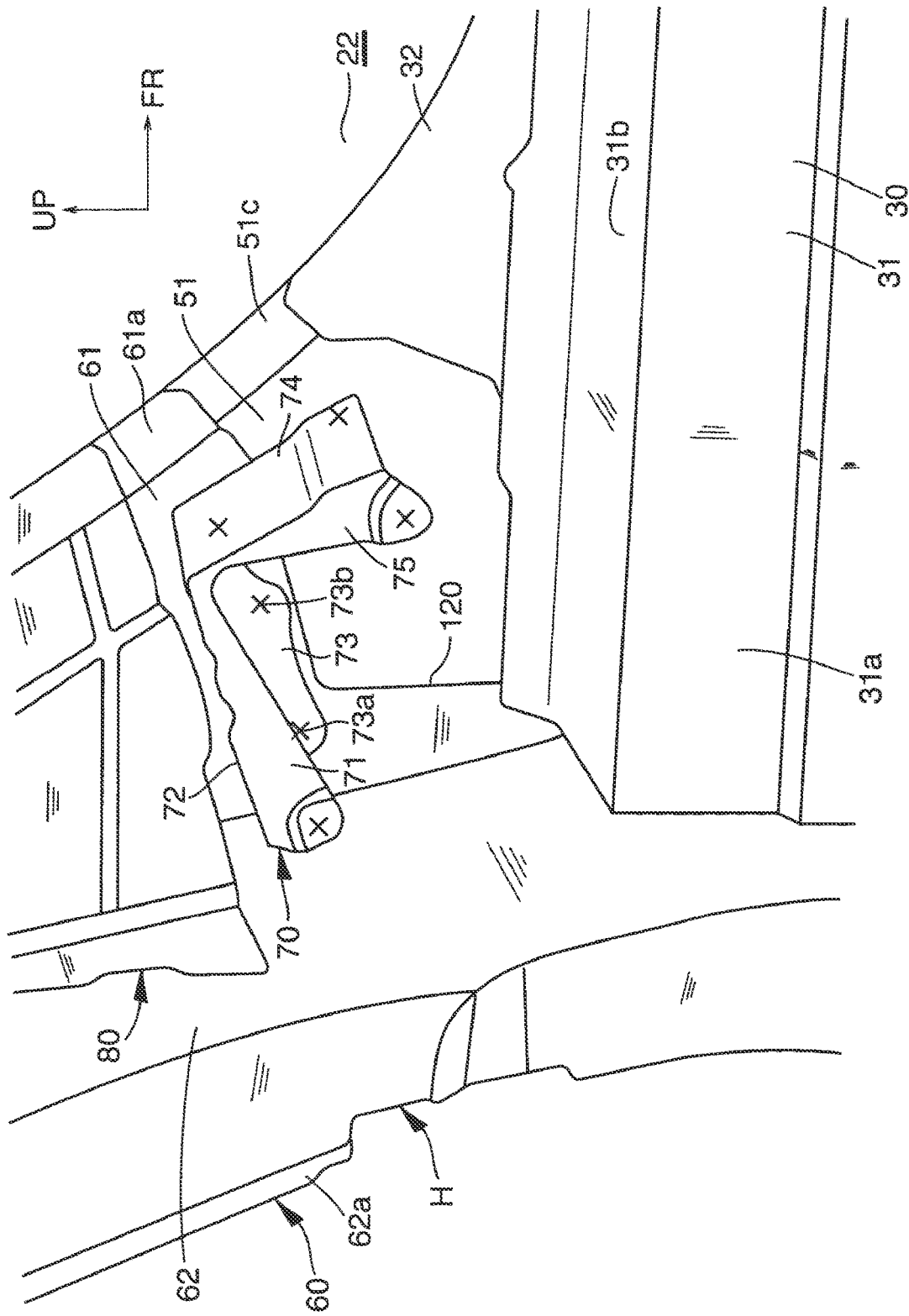
FIG. 5 is a perspective view when the rocker outer rear is omitted in FIG. 4.

With reference to FIG. 2, the joining (joining at the joining portions 73a, 73b) between the third wall 73 of the bulk 70 and the front portion 61 of the rear wheel house outer 60 is performed after the first wall 71, the fourth wall 74, and the fifth wall 75 of the bulk 70 are joined to the rocker outer rear 40, the rocker outer rear 40 is joined to the rear wheel house outer 60, and the rear quarter panel 110 is joined to the rocker outer rear 40 and the rear wheel house outer 60, but before the rocker inner rear 50 is joined to the rocker outer rear 40. Accordingly, depending on the shape of the front portion 61 of the rear wheel house outer 60, when a spot gun (not shown) for spot welding accesses the joining portions 73a, 73b from the inner side in the vehicle width direction, it might be difficult for the spot gun to access the joining portions 73a, 73b. In view of this, as illustrated in FIG. 5, it is desirable that a notch (opening) 120 that allows the spot gun to access the joining portions 73a, 73b be provided between the front portion 61 of the rear wheel house outer 60 and the rocker inner 32. The notch 120 is formed so as to cut the front portion 61 of the rear wheel house outer 60 from its front edge toward the rear side.

Next will be described operations and effects of the embodiment of the disclosure.

(A) The bulk 70 includes the first wall 71 joined to the rocker outer rear 40, and the second wall 72 bending from the first wall 71 so as to extend toward the rocker inner rear 50 (inwardly in the vehicle width direction), and further includes the third wall 73 bending from the second wall 72 so as to be joined to the front portion 61 of the rear wheel house outer 60. Accordingly, a load input into the rocker outer rear 40 from the impact beam 20 at the time of a side collision of the vehicle can be directly transmitted to the front portion 61 of the rear wheel house outer 60 via the bulk 70 withstanding the load. Since the front portion 61 of the rear wheel house outer 60 is placed between the rocker outer rear 40 and the rocker inner rear 50, the load input into the front portion 61 of the rear wheel house outer 60 is transmitted to the rocker inner rear 50. Accordingly, it is possible to efficiently transmit the load input into the rocker outer rear 40 to the rocker inner rear 50 via the bulk 70 and the front portion 61 of the rear wheel house outer 60.

(B) Since the bulk 70 is configured such that the first wall 71 is joined to the rocker outer rear 40 and the third wall 73 is joined to the front portion 61 of the rear wheel house outer 60, it is possible to restrain movement of the bulk 70 relative to the rocker outer rear 40 and the rear wheel house outer 60, and it is possible to efficiently transmit a load from the rocker outer rear 40 to the front portion 61 of the rear wheel house outer 60 via the bulk 70.

(C) Since the third wall 73 of the bulk 70 and the front portion 61 of the rear wheel house outer 60 are joined to each other at least at the points in the front-rear direction, it is possible to join the bulk 70 to the front portion 61 of the rear wheel house outer 60 in a wide range in comparison with a case where the bulk 70 is joined to the front portion 61 of the rear wheel house outer 60 at one place (one point). Accordingly, it is possible to effectively restrain a relative deformation between the bulk 70 and the rear wheel house outer 60. Hereby, it is possible to further improve load transmission efficiency from the bulk 70 to the front portion 61 of the rear wheel house outer 60.

(D) The second wall 72 of the bulk 70 extends in a direction parallel to the extending direction of the impact beam 20 in the side view. Accordingly, an overlapping amount between the second wall 72 and the impact beam 20 can be made large in the side view in comparison with a case where the second wall 72 does not extend in the direction parallel to the extending direction of the impact beam 20, e.g., a case where the second wall 72 of the bulk 70 extends in a direction perpendicular to the extending direction of the impact beam 20. Accordingly, it is possible to transmit a load from the rocker outer rear 40 to the front portion 61 of the rear wheel house outer 60 via the bulk 70 in a wide range, thereby making it possible to further improve the load transmission efficiency.

(E) Since the joining portions 73*a*, 73*b* between the third wall 73 of the bulk 70 and the front portion 61 of the rear wheel house outer 60 are provided at positions overlapping with the impact beam 20 or on the extension line of the impact beam 20 in the extending direction, it is possible to efficiently restrain relative movement between the bulk 70 and the front portion 61 of the rear wheel house outer 60 at the time of load transmission. This is advantageous in terms of load transmission from the bulk 70 to the front portion 61 of the rear wheel house outer 60.

(F) In the side view, the length, in the front-rear direction, of the rear-side portion 72*e* of the second wall 72 of the bulk 70 is equal to or longer than the length, in the front-rear direction, of the front-side portion 72*d* of the second wall 72. Accordingly, when a load from the rocker outer rear 40 is transmitted to the front portion 61 of the rear wheel house outer 60 via the bulk 70, the rear-side portion 72*e* of the second wall 72 withstands the load between the rocker outer rear 40 and the front portion 61 of the rear wheal house outer 60 so as to serve as a support portion, thereby making it possible to effectively restrain the second wall 72 from being displaced (falling down) such that its front side rotates inwardly in the vehicle width direction relative to its rear side along with a deformation of the rocker outer rear 40. Hereby, the posture of the bulk 70 can be maintained at the time of load transmission via the bulk 70, and this is advantageous in terms of load transmission.

(G) In the side view, the length, in the up-down direction, of the lower-side portion 74*d* of the fourth wall 74 of the bulk 70 is equal to or longer than the length, in the up-down direction, of the upper-side portion 74*c* of the fourth wall 74. Accordingly, when a load from the rocker outer rear 40 is transmitted to the front portion 61 of the rear wheel house outer 60 via the bulk 70, the lower-side portion 74*d* of the fourth wall 74 withstands the load between the rocker outer rear 40 and the front portion 61 of the rear wheel house outer 60 so as to serve as a support portion, thereby making it possible to effectively restrain the fourth wall 74 from being displaced (falling down) such that its upper side rotates inwardly in the vehicle width direction relative to its lower side along with a deformation of the rocker outer rear 40. Hereby, the posture of the bulk 70 can be maintained at the time of load transmission via the bulk 70, and this is advantageous in terms of load transmission.

(H) Since the bulk 70 includes the fourth wall 74 bending from the front end portion 72*f* of the second wall 72 so as to extend downward, the bulk 70 has an "L" shape in the side view. Due to the bulk 70 having the "L" shape, it is also possible to yield the effects (F) and (G) at the same time. Accordingly, it is possible to extremely effectively restrain the bulk 70 from falling down.

(I) Since the rear wheel house outer 60 and the rocker outer rear 40 form the closed section portion 90, it is possible to increase rigidities of the rocker outer rear 40 and the rear wheel house outer 60 in comparison with a case where the closed section portion 90 is not formed. Further, since the bulk 70 is provided inside the closed section portion 90, it is possible to further increase rigidity of the closed section portion 90 by the bulk 70. Accordingly, it is possible to further improve transmission efficiency of a load transmitted from the rocker outer rear 40 to the front portion 61 of the rear wheel house outer 60 via the bulk 70.

(J) In the embodiment of the disclosure, a load from the rocker outer rear 40 is efficiently introduced into the rocker inner rear 50 via the bulk 70 and the rear wheel house outer 60 without thickening the rocker outer rear 40, the rear wheel house outer 60, and the bulk 70. Accordingly, it is possible to restrain an increase in weight of the vehicle and to efficiently introduce a load into a vehicle under component (the rocker inner rear 50), thereby making it possible to increase a reaction force from the rocker outer rear 40 toward the impact beam 20.

What is claimed is:

1. A vehicle rear structure comprising:
    an impact beam extending in a vehicle front-rear direction inside a rear door;
    a rocker outer rear and a rocker inner rear extending upward in a vehicle up-down direction from a rear portion of a rocker in the vehicle front-rear direction;
    a rear wheel house outer including a front portion extending in the vehicle front-rear direction and placed between the rocker outer rear and the rocker inner rear; and a bulk including:
  a first wall provided between the rocker outer rear and the rocker inner rear and joined to the rocker outer rear;
  a second wall bending from the first wall to extend toward the rocker inner rear; and
  a third wall placed at a position where the third wall at least partially overlaps with the impact beam as viewed in a vehicle width direction, the third wall bending from the second wall and joined to the front portion of the rear wheel house outer.

2. The vehicle rear structure according to claim 1, wherein the third wall is joined to the front portion of the rear wheel house outer at a plurality of points which differ in position from each other at least in the vehicle front-rear direction.

3. The vehicle rear structure according to claim 1, wherein the second wall extends in a direction parallel to an extending direction of the impact beam as viewed in the vehicle width direction.

4. The vehicle rear structure according to claim 1, wherein a joining portion between the third wall and the front portion of the rear wheel house outer is provided at a position overlapping with the impact beam or on an extension line of the impact beam in an extending direction of the impact beam as viewed in the vehicle width direction.

5. The vehicle rear structure according to claim 1, wherein:
  the second wall includes a front-side portion placed at a position overlapping with the impact beam as viewed in the vehicle width direction, and a rear-side portion placed behind the front-side portion at a position that does not overlap with the impact beam as viewed in the vehicle width direction; and
  a length of the rear-side portion of the second wall in the vehicle front-rear direction is equal to or longer than a length of the front-side portion of the second wall in the vehicle front-rear direction.

6. The vehicle rear structure according to claim 1, wherein:
  the bulk includes a fourth wall bending from a front end portion of the second wall to extend downward in the vehicle up-down direction;
  the fourth wall includes an upper-side portion placed at a position overlapping with the impact beam as viewed in the vehicle width direction, and a lower-side portion placed below the upper-side portion in the vehicle up-down direction and not overlapping with the impact beam as viewed in the vehicle width direction; and
  a length of the lower-side portion of the fourth wall in the vehicle up-down direction is equal to or longer than a length of the upper-side portion of the fourth wall in the vehicle up-down direction.

7. The vehicle rear structure according to claim 1, wherein:
  the rear wheel house outer includes a lateral extension portion bending from a rear end portion of the front portion in the vehicle front-rear direction so as to extend outwardly in the vehicle width direction;
  the front portion and the lateral extension portion of the rear wheel house outer are joined to the rocker outer rear so as to form a closed section together with the rocker outer rear; and
  the bulk is provided inside the closed section.

8. The vehicle rear structure according to claim 1, wherein the third wall extends downward in a vehicle up-down direction from the second wall.

\* \* \* \* \*

UNITED STATES PATENT AND TRADEMARK OFFICE
CERTIFICATE OF CORRECTION

PATENT NO. : 10,710,639 B2
APPLICATION NO. : 16/131176
DATED : July 14, 2020
INVENTOR(S) : Kazuma Otoguro and Jumpei Nishide It is certified that error appears in the above-identified patent and that said Letters Patent is hereby corrected as shown below:

On the Title Page

Item (57), abstract, Line(s) 11, delete "bean" and insert --beam--, therefor.

In the Specification

In Column 1, Line(s) 27, delete "front" and insert --from--, therefor.

In Column 3, Line(s) 25, delete "beans" and insert --beam--, therefor.

Signed and Sealed this
Seventeenth Day of November, 2020

Andrei Iancu
*Director of the United States Patent and Trademark Office*